United States Patent
Hayashida

[11] Patent Number: 6,054,518
[45] Date of Patent: Apr. 25, 2000

[54] SILICONE RUBBER MOLDING COMPOSITIONS AND METHOD FOR PRODUCING SILICONE RUBBER MOLDED PARTS

[75] Inventor: Osamu Hayashida, Usui-gun, Japan

[73] Assignee: Shin-Etsu Chemical Co., Ltd., Tokyo, Japan

[21] Appl. No.: 09/154,011

[22] Filed: Sep. 16, 1998

[30] Foreign Application Priority Data

Sep. 17, 1997 [JP] Japan .................................. 9-270639

[51] Int. Cl.⁷ ........................................ C08K 5/10
[52] U.S. Cl. ................................ 524/310; 264/300
[58] Field of Search .................. 560/180, 182; 524/313, 311, 314, 310, 588, 493; 264/226, 300, 331.11

[56] References Cited

U.S. PATENT DOCUMENTS

| | | | |
|---|---|---|---|
| 3,231,542 | 1/1966 | Eisinger et al. . | |
| 3,310,521 | 3/1967 | White et al. . | |
| 3,396,121 | 8/1968 | Miksch et al. | 560/180 |
| 3,660,345 | 5/1972 | Bobear . | |
| 3,784,595 | 1/1974 | Schirmer et al. | 524/313 |
| 3,836,489 | 9/1974 | Bargain . | |
| 3,917,555 | 11/1975 | Worschech et al. | 524/314 |
| 3,929,712 | 12/1975 | Hiyama et al. | 264/300 |
| 4,214,054 | 7/1980 | Watanake et al. . | |
| 4,725,658 | 2/1988 | Thayer et al. . | |
| 4,782,101 | 11/1988 | Waller et al. | 524/314 |
| 4,866,026 | 9/1989 | Henzel et al. . | |
| 5,100,727 | 3/1992 | Kaneko et al. | 428/195 |
| 5,157,089 | 10/1992 | Elmore et al. | 526/210 |
| 5,219,558 | 6/1993 | Woodin et al. . | |
| 5,298,234 | 3/1994 | Nakazawa et al. | 501/154 |
| 5,521,245 | 5/1996 | Hirabayashi et al. . | |
| 5,596,034 | 1/1997 | Krishnan et al. | 524/314 |
| 5,683,955 | 11/1997 | Hiroi et al. | 503/227 |
| 5,690,918 | 11/1997 | Jacks et al. . | |

*Primary Examiner*—Veronica P. Hoke
*Attorney, Agent, or Firm*—Millen, White, Zelane, & Branigan, P.C.

[57] ABSTRACT

In a silicone rubber composition comprising an organopolysiloxane, reinforcing silica, and a curing agent, an ester wax, typically having a melting point of 40–150° C., is blended as an abherent. When the composition is molded in a mold, the flow of the composition in the mold and the parting of the cured silicone rubber from the mold are significantly improved.

10 Claims, No Drawings

SILICONE RUBBER MOLDING COMPOSITIONS AND METHOD FOR PRODUCING SILICONE RUBBER MOLDED PARTS

BACKGROUND OF THE INVENTION

1. Field of the Invention

This invention relates to silicone rubber molding compositions and a method for producing silicone rubber molded parts therefrom using a mold.

2. Background Art

Silicone rubber is used in a variety of applications because of heat resistance, low-temperature resistance and electrical properties. A variety of methods are known for molding silicone rubber compounds. Depending on a particular application or purpose, a choice is made from among compression molding, transfer molding, injection molding and extrusion molding (or hot air vulcanization).

These molding methods, however, suffer from the problem of inefficient operation. That is, when silicone rubber compounds are molded into silicone rubber parts using molds, the molded silicone rubber cannot be smoothly released from the mold.

Known solutions to this problem include the chromium plating of a mold surface and the coating of a mold surface with fluorocarbon resin. The chromium plating is still insufficient in parting properties. The coating of fluorocarbon resin is expensive. It is also known to apply abherents such as surfactants, halocarbon polymers and talc to molds. The coatings of such abherents are not sustainable and can contaminate molded parts.

In order to improve the release properties of silicone rubber itself, JP-B 45099/1980 and U.S. Pat. No. 3,549,744 propose to blend carboxylic acids or metal salts thereof in silicone rubber compositions. These additives largely detract from the compression set and flame retardancy of silicone rubber and impart insufficient release properties.

JP-B 19951/1980 discloses blending of metal salts of higher fatty acids, JP-A 44655/1982 discloses blending of high fatty acids, and JP-A 194949/1983 discloses a mixture of an amide and polytetrafluoroethylene (PTFE). These additives detract from heat resistance and impart insufficient release properties.

SUMMARY OF THE INVENTION

An object of the present invention is to provide a novel and improved silicone rubber molding composition which is significantly improved in mold release properties and flow behavior in molds without adversely affecting silicone rubber properties. Another object of the present invention is to provide a method for producing silicone rubber molded parts from the silicone rubber composition.

We have found that when a silicone rubber composition comprising an organopolysiloxane, reinforcing silica, and a curing agent is molded in a mold, the mold release properties and in-mold flow behavior of the composition are significantly improved by blending an ester wax in the composition. The ester wax blended does not detract from the properties of molded silicone rubber at all.

Accordingly, the present invention provides a silicone rubber composition to be molded in a mold, comprising an organopolysiloxane, reinforcing silica, and a curing agent, characterized in that an ester wax is blended therein.

In another aspect, the present invention provides a method for producing a silicone rubber molded part comprising the steps of feeding the silicone rubber composition into a mold and molding the composition therein.

DETAILED DESCRIPTION OF THE INVENTION

The silicone rubber composition of the invention is to be molded in a mold. The composition contains as essential components, (A) an organopolysiloxane,
(B) reinforcing silica, and
(C) a curing agent.

The organopolysiloxane (A) is typically of the average compositional formula:

$$R_a^1 SiO_{(4-a)/2}$$

wherein $R^1$ independently represents substituted or unsubstituted monovalent hydrocarbon groups, and letter a is a positive number of 1.90 to 2.05. More illustratively, $R^1$, which groups may be the same or different, represents substituted or unsubstituted monovalent hydrocarbon groups, preferably having 1 to 10 carbon atoms, more preferably 1 to 8 carbon atoms, for example, alkyl groups such as methyl, ethyl, propyl and butyl, cycloalkyl groups such as cyclohexyl, alkenyl groups such as vinyl, allyl, butenyl and hexenyl, aryl groups such as phenyl and tolyl, and substituted ones of these groups in which some or all of the hydrogen atoms attached to carbon atoms are replaced by halogen atoms or cyano, such as chloromethyl, trifluoropropyl and cyanoethyl. Of these, methyl, phenyl, vinyl and trifluoropropyl are preferred. It is essential that the organopolysiloxane contain at least two aliphatic unsaturated groups (typically alkenyl groups) as $R^1$. The content of aliphatic unsaturated groups in $R^1$ is preferably 0.001 to 20 mol %, more preferably 0.025 to 5 mol %.

Most often, the organopolysiloxanes of the above formula are preferably linear while a mixture of two or more organopolysiloxanes having different molecular structures is acceptable. The organopolysiloxanes preferably have a degree of polymerization of about 100 to about 20,000, more preferably about 3,000 to about 10,000.

The organopolysiloxane is generally prepared by co-hydrolysis and condensation of one or more selected organohalogenosilanes or by effecting ring-opening polymerization of a cyclic polysiloxane (typically a trimer or tetramer of siloxane) in the presence of a basic or acidic catalyst.

Component (B) is reinforcing silica which preferably has a specific surface area (BET) of at least 50 $m^2/g$, more preferably 100 to 400 $m^2/g$. Examples of the silica include fumed silica, precipitated or wet silica and fired silica. Silica may have been surface treated with suitable agents such as alkoxysilanes, chlorosilanes, silazanes, low molecular weight chain or cyclic organopolysiloxanes for rendering the surface hydrophobic. A mixture of different silica species is also useful. Preferably, reinforcing silica is blended in amounts of about 5 to 100 parts, especially about 10 to 50 parts by weight, per 100 parts by weight of the organopolysiloxane (A). Less than 5 parts of silica would be too small to achieve sufficient reinforcement whereas silicone rubber compounds containing more than 100 parts of silica would become difficult to process.

Component (C) is a curing agent. Where the composition is of peroxide crosslinking system, the curing agent is an organic peroxide. Where the composition is of addition reaction crosslinking system, the curing agent is a combination of an organohydrogenpolysiloxane having at least two hydrogen atoms each attached to a silicon atom per molecule with a platinum catalyst.

Exemplary organic peroxides are dicumyl peroxide, 2,5-dimethyl-2,5-bis(t-butylperoxy)hexane, 2,5-dimethyl-2,5-bis(t-butylperoxy)hexyne, t-butylperoxybenzoate, 1,6-bis(t-butylperoxycarboxy)hexane, benzoyl peroxide, 2,4-dichlorobenzoyl peroxide, p-methylbenzoyl peroxide, and o-methylbenzoyl peroxide. The amount of organic peroxide blended is preferably about 0.1 to 10 parts by weight per 100 parts by weight of the organopolysiloxane (A).

The organohydrogenpolysiloxane having at least two SiH groups per molecule may be linear, cyclic or branched. A choice may be made of well-known organohydrogenpolysiloxanes for addition reaction curing type silicone rubber compositions. Often, the organohydrogenpolysiloxane is of the following average compositional formula:

$$R_b^2H_cSiO_{(4-b-c)/2}$$

wherein $R^2$ represents substituted or unsubstituted monovalent hydrocarbon groups, preferably of 1 to 12 carbon atoms, especially 1 to 8 carbon atoms, as defined for $R^1$, such as alkyl, alkenyl, aryl, aralkyl, and halogen or cyano-substituted groups thereof, letters b and c are positive numbers satisfying $1 \leq b \leq 2.2$, $0.002 \leq c \leq 1$, and $1.002 \leq b+c \leq 3$.

The organohydrogenpolysiloxane has at least two, preferably at least three SiH groups per molecule while the SiH groups may be situated at ends of its molecular chain or intermediate. Preferably, the organohydrogenpolysiloxane has a viscosity of up to 300 centistokes at 25° C.

The amount of organohydrogenpolysiloxane blended is preferably about 0.01 to 10 parts by weight per 100 parts by weight of the organopolysiloxane (A). Also preferably, the organohydrogenpolysiloxane is blended such that 0.5 to 10 silicon atom-attached hydrogen atoms (≡SiH groups) are available per alkenyl group in component (A), and more preferably 1 to 4 ≡SiH groups are available per alkenyl group in component (A).

The platinum catalyst is selected from conventional catalysts known as addition reaction catalysts. Elemental metals belonging to the platinum group and compounds thereof are useful. Examples include particulate platinum adsorbed on carriers such as silica, alumina and silica gel, platinum chloride, chloroplatinic acid, complexes of chloroplatinic acid hexahydrate with olefins or divinyldimethylpolysiloxane, alcohol solutions of chloroplatinic acid hexahydrate, palladium catalysts, and rhodium catalysts. These catalysts are used in catalytic amounts. Typically, the catalyst is used in such amounts as to give 1 to 1,000 ppm, especially 10 to 100 ppm, of platinum group metal. Less than 1 ppm of platinum group metal is too small to promote crosslinking reaction, resulting in short curing, whereas more than 1,000 ppm has little further effect on reactivity and is uneconomical.

According to the invention, an ester wax is blended in the silicone rubber composition comprising components (A), (B) and (C) as essential components.

The ester wax preferably has a melting point of 40 to 150° C., especially 40 to 100° C., under atmospheric pressure. An ester wax with a melting point of lower than 40° C. would be ineffective for improving the separation of hot silicone rubber from a mold whereas an ester wax with a melting point of higher than 150° C. would not be thoroughly dispersed in a silicone rubber compound.

Also preferably, the ester wax is selected from esters between a carboxylic acid of 6 or more carbon atoms and a polyhydric alcohol and esters between a polyfunctional carboxylic acid of 6 or more carbon atoms and an alcohol.

The ester wax is typically of the following general formula (1):

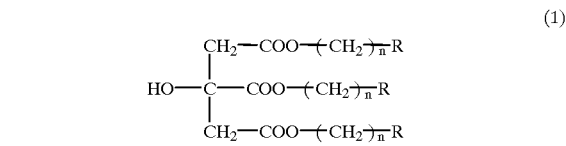

(1)

wherein R independently represents alkyl groups of 1 to 4 carbon atoms, and letter n independently represents such integers that the ester wax may have a melting point of 40 to 150° C. under atmospheric pressure. Preferably n is selected from integers of 6 to 20.

One example of the ester wax of formula (1) is given below.

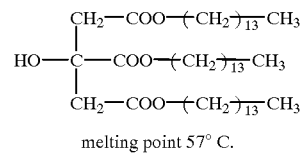

melting point 57° C.

The ester wax is commercially available. For example, Kao Wax 220 and Kao Wax 85 by Kao K.K. are useful.

The amount of ester wax blended is preferably about 0.05 to 5 parts, more preferably about 0.1 to 3 parts by weight, per 100 parts by weight of the organopolysiloxane (A). Less than 0.05 part of the ester wax would be ineffective for imparting release properties whereas more than 5 parts would sometimes adversely affect heat resistance.

It is not critical how to add the ester wax to the silicone rubber compound. For example, the ester wax may be concurrently blended when components (A) and (B) are kneaded using a mixer such as a kneader or roll mill. Alternatively, the ester wax is blended after components (A) and (B) are kneaded. The kneading temperature is preferably set slightly above the melting point of the ester wax so that the ester wax may be uniformly dispersed in the silicone rubber compound. It is recommended to add curing agent (C) at the end of blending and often, just prior to use.

In addition to the essential components, components (A) to (C) and ester wax, the silicone rubber composition of the invention may contain additives commonly blended in conventional silicone rubbers, if necessary. Such additives include ground silica, diatomaceous earth, iron oxide, zinc oxide, titanium oxide, carbon black, barium oxide, magnesium oxide, cerium oxide, calcium carbonate, magnesium carbonate, zinc carbonate, asbestos, glass wool, fine mica, and fused silica powder. Further, if desired, pigments, dyestuffs, anti-aging agents, antioxidants, antistatic agents, flame retardants (e.g., antimony oxide and chlorinated paraffin), blowing agents, and heat transfer modifiers (e.g., boron nitride and aluminum oxide) may be blended.

According to the invention, the silicone rubber composition comprising components (A) to (C) and ester wax is introduced into molds such as molds for compression molding, transfer molding and injection molding where the composition is shaped. The invention is applicable to the technology of molding silicone rubber using molds. The molding conditions may be the same as in conventional molding methods. Preferred molding conditions include a temperature of 100 to 200° C., especially 120 to 180° C., and a time of 1 to 30 minutes.

The mold used herein may be a mold commonly used for such purposes. A conventional mold whose inner surface to come in contact with the silicone rubber composition is formed of stainless steel or chromium plating layer is often used.

EXAMPLE

Examples of the invention are given below by way of illustration and not by way of limitation. All parts are by weight.

Example 1 & Comparative Examples 1–2

A base compound was obtained by uniformly mixing in a kneader 100 parts of a methylvinylpolysiloxane gum consisting of 99.85 mol % of $(CH_3)_2SiO$ units and 0.15 mol % of $(CH_3)$ $(CH_2=CH)SiO$ units, end-blocked with $(CH_2=CH)$ $(CH_3)_2SiO$ units, and having a degree of polymerization of about 7,000 as an organopolysiloxane, 25 parts of fumed silica having a specific surface area of $200m^2/g$, and 1 part of a dimethylpolysiloxane terminated with hydroxyl groups and having a degree of polymerization of 10 and 3 parts of a methylvinylpolysiloxane terminated with hydroxyl groups and having a vinyl content of 5 mol % based on the entire organic groups and a degree of polymerization of 15 as dispersants, and heat treating the mixture at 170° C. for 2 hours. At 100° C., 0.3 part of an ester wax Kao Wax 220 having a melting point of 57° C. (Kao K.K.) was added to 100 parts of the base compound, obtaining Composition (I) of Example 1.

Composition (II) of Comparative Example 1 was prepared by the same procedure as Composition (I) except that 0.3 part of zinc stearate was used instead of the ester wax.

Composition (III) of Comparative Example 2 was prepared by the same procedure as Composition (I) except that the ester wax was omitted.

To each of these compositions, 0.5 part of 2,5-bis(t-butylperoxy)-2,5-dimethylhexane was added. The resulting composition was introduced into a mold for compression molding whose cavity-defining inner surface was formed of stainless steel. In the mold, the composition was press cured at 170° C. for 10 minutes into a disc having a diameter of 25 mm and a height of 1.2 mm. The disc was removed from the mold. At this point, a parting force necessary to remove the disc from the mold was measured. The disc was measured for impact resilience and compression set (180° C./22 hours). The results are shown in Table 1.

TABLE 1

|  | Example 1 | Comparative Example 1 | Comparative Example 2 |
|---|---|---|---|
| Parting agent | Kao Wax 220 0.3 part | Zinc stearate 0.3 part | none |
| Parting force (kgf/cm2) | 2.8 | 2.8 | 6.3 |
| Resilience (%) | 85 | 50 | 89 |
| Compression set (%) | 13 | 30 | 12 |

Example 2 & Comparative Example 3

Compositions were prepared by the same procedure as Composition (I) of Example 1 except that 0.4 part of the ester wax Kao Wax 220 or 0.4 part of butyl stearate was used as the abherent as shown in Table 2. Note that butyl stearate is a liquid at room temperature.

To each of these compositions, 0.5 part of 2,5-bis(t-butylperoxy)-2,5-dimethylhexane was added. The resulting composition was injection molded under the following conditions. Using a Rheovulca meter (Gotterfert AG, Germany), a discharge amount was measured.

Gate: 2 mm diameter×20 mm

Pressure: 25 bar

Injection time: 90 seconds

Temperature: 150° C.

Charge: 8 g

The discharge amount and the physical properties of the molded silicone rubber parts are shown in Table 2.

TABLE 2

|  | Example 2 | Comparative Example 3 |
|---|---|---|
| Parting agent | Kao Wax 220 0.4 part | Butyl stearate 0.4 part |
| Discharge amount (g) | 4.3 | 2.7 |
| Resilience (%) | 80 | 88 |
| Compression set (%) | 15 | 13 |

There has been described a silicone rubber composition comprising an organopolysiloxane, reinforcing silica, a curing agent, and an ester wax. When the silicone rubber composition is molded in a mold, the flow of the composition in the mold and the parting of the cured silicone rubber from the mold are significantly improved. The invention is advantageous in molding silicone rubber parts in a mold.

Japanese Patent Application No. 270639/1997 is incorporated herein by reference.

Reasonable modifications and variations are possible from the foregoing disclosure without departing from either the spirit or scope of the present invention as defined by the claims.

What is claimed is:

1. A silicone rubber composition, comprising (A) 100 parts by weight of an organopolysiloxane containing at least two aliphatic unsaturated groups and having an average compositional formula:

$$R_a^1 SiO_{(4-a)/2}$$

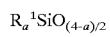

wherein $R^1$ independently represents halogen- or cyano-substituted or unsubstituted monovalent hydrocarbon groups having 1 to 10 carbon atoms, and letter a is a positive number of 1.90 to 2.05, (B) about 5 to 100 parts by weight of a reinforcing silica,
    (C) an amount effective to cure the organopolysiloxane (A) of a curing agent, and
    (D) about 0.5 to 5 parts by weight of an ester wax of the following formula (I):

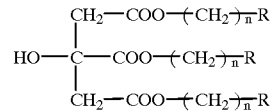

wherein R independently represents alkyl groups of 1 to 4 carbon atoms, and letter n independently represents integers such that the ester wax has a melting point of 40 to 150° C. under atmospheric pressure.

2. The composition of claim 1, wherein the ester wax has a melting point of from 40 to 100° C.

3. The composition of claim 1, wherein the ester wax is provided in an amount of 0.1 to 3 parts by weight per 100 parts by weight of the organopolysiloxane (A).

4. The composition of claim 1, wherein the reinforcing silica, (B), has a BET specific surface area of at least 50 $m^2/g$.

5. The composition of claim 1, wherein the reinforcing silica, (B), has a BET specific surface area of from 100 to 400 $m^2/g$.

6. The composition of claim 1, wherein the reinforcing silica, (B), is fumed silica, precipitated silica or fired silica.

7. The composition of claim 1, wherein the reinforcing silica, (B), is provided in an amount of about 10 to 50 parts by weight per 100 parts by weight of the organopolysiloxane (A).

8. The composition of claim 1, wherein the curing agent is
   (C-1) an organic peroxide, or
   (C-2) an organohydrogenpolysiloxane having at least two hydrogen atoms each attached to a silicon atom per molecule with a platinum catalyst.

9. A method for producing a silicone rubber molded part which comprises feeding a silicone rubber composition according to claim 1 into a mold and molding the molded part therein.

10. The method of claim 9, wherein the molding is conducted at a temperature of 100 to 200° C. for 1 to 30 minutes.

* * * * *